United States Patent [19]

Meyer et al.

[11] 4,420,545
[45] Dec. 13, 1983

[54] LIGHTWEIGHT METAL-GAS BATTERY

[75] Inventors: Theodore O. Meyer, Sunnyvale; Thomas E. Hickman, Cupertino, both of Calif.

[73] Assignee: Ford Aerospace & Communications Corporation, Detroit, Mich.

[21] Appl. No.: 318,512

[22] Filed: Nov. 5, 1981

[51] Int. Cl.³ .......................................... H01M 2/30
[52] U.S. Cl. .................................... 429/101; 429/178
[58] Field of Search ......................... 429/101, 57, 178

[56] References Cited

U.S. PATENT DOCUMENTS

| | | | |
|---|---|---|---|
| 3,669,744 | 6/1972 | Tsenter et al. | 136/28 |
| 3,867,199 | 2/1975 | Dunlop et al. | 136/28 |
| 4,098,962 | 7/1976 | Dennison | 429/101 |
| 4,115,630 | 9/1978 | van Ommering et al. | 429/72 |
| 4,177,328 | 12/1979 | Rogers | 429/81 |
| 4,189,527 | 2/1980 | Stadnick et al. | 429/101 |
| 4,324,845 | 4/1982 | Stockel | 429/101 |

OTHER PUBLICATIONS

Giner et al., The Sealed Nickel-Hydrogen Secondary Cell, J. Electrochem. Soc., Electrochemical, Science and Technology, 1/1975, vol. 122, No. 1, pp. 1-11.
Haas et al., Silver-Hydrogen, A Long Life Light Weight Energy Storage System, Proceedings of the 13th Intersociety Energy Conversion Engineering Conference. San Diego, Calif. Aug. 20-25, 1978, pp. 74-79.

Primary Examiner—Donald L. Walton
Attorney, Agent, or Firm—Edward J. Radlo; Robert D. Sanborn

[57] ABSTRACT

A new structure for a pressurized metal-gas battery is presented, with emphasis upon reducing weight and volume. Thus, the battery is particularly suitable for spacecraft applications. Positive and negative terminals are moved away from the center axis of the terminating ellipsoidal domes of a cylindrically shaped pressure vessel, thus permitting smaller size and saving weight while providing torsional support to the electrode stack. A center rod and end plates are fabricated of an insulative, chemically resistant material having a high strength-to-weight ratio, and provide both axial and radial support for the electrode stack while permitting expansion and contraction of the pressure vessel independently of the stack. A weld ring for joining together two sections of the pressure vessel is placed in the center of the cylindrical portion of the battery, is freed from any requirement to provide mechanical support for the electrode stack, and advantageously permits the fabrication of the pressure vessel as two essentially identical halves.

13 Claims, 9 Drawing Figures

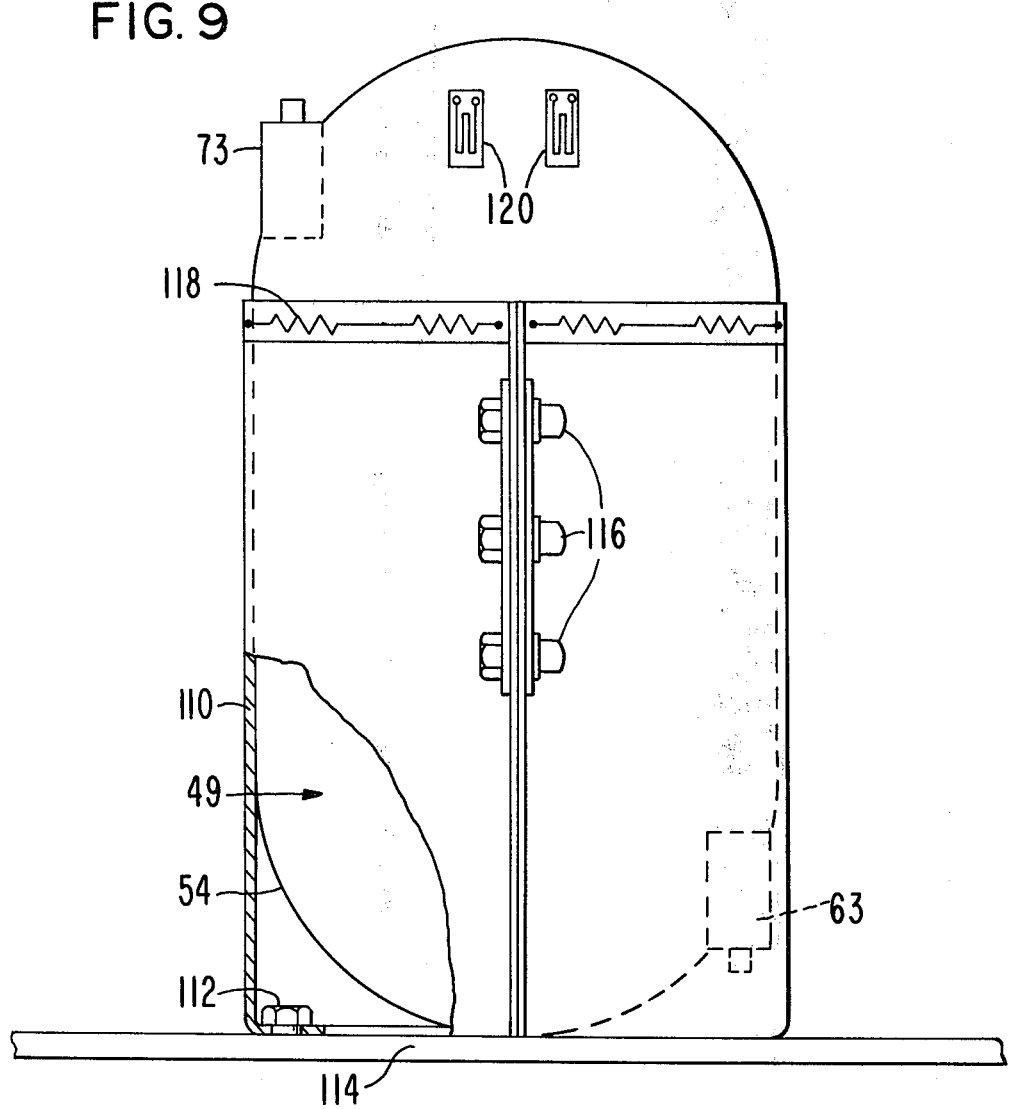

LIGHTWEIGHT METAL-GAS BATTERY

BACKGROUND OF THE INVENTION

1. Field of the Invention

This invention pertains to the field of metal-gas batteries, such as nickel-hydrogen batteries. Such batteries exhibit high specific energy and find particular applicability in spacecraft, where weight savings is critical.

2. Description of the Prior Art

A prior art search uncovered the following U.S. patent references:

U.S. Pat. No. 4,115,630 is illustrative of the prior art. The present invention differs from this patent in that: the electrical function of the center rods is eliminated; much shorter and lighter terminal leads are used; the end plates and center rod do not attach rigidly to the weld ring of the pressure vessel, thus the pressure vessel can expand independently of the electrode stacks; and the weld ring does not attach to the battery stack.

U.S. Pat. No. 4,177,328 discloses a wall wick used in a nickel-hydrogen cell. The present invention addresses an improvement in the structural/mechanical design and does not intend to provide an electrolyte management device, such as the wall wick. The present invention can be combined with a wall wick or an insulative barrier to prevent electrolyte-pressure vessel interaction.

U.S. Pat. No. 3,669,744 discloses a hermetically sealed nickel-hydrogen storage cell; an end plate bonded to the inner wall of the pressure vessel supports the battery stack; one of the terminals is fed through the upper end of the pressure vessel along the center axis of the vessel. Since the electrode stack is supported only by the bus bars, mechanical loading and vibration could cause electrode fracture and a resulting cell capacity loss. The present invention avoids this problem by providing axial stack support via the center rod and radial support via the end plates with a flexible joint between terminals and bus bars.

U.S. Pat. No. 3,867,199 discloses a type of electrode that could be utilized in the present invention.

SUMMARY OF THE INVENTION

In the battery of the present invention, the electrode stack is supported by means of using the end plates (52 and 60) in a dual purpose manner. The end plates axially compress the electrode stack (56) and support it radially within the pressure vessel (54). This reduces stack stress during vibration and cell cycling. The stack is not bonded to the pressure vessel at any point in the battery (49). The stack assembly (electrodes, separators, end plates, center rod, etc.) is a free unit confined only by the vessel boundary.

The weld ring's (70) function as a stack support means is eliminated. This design permits placement of the weld ring (70) at any location, for example, along the longitudinal center of the vessel (54), simplifying production. It also allows the weld ring to be made thinner, permitting vessel expansion with cycling and reducing stress at the weld. Thus, higher operating pressures or increased safety margins are possible.

The present invention replaces the stack support function of the weld ring with a rigid center rod (51) and end plates (52, 60) which fit tightly into the pressure vessel. These components are manufactured of nonconductive material, such as a high-strength polymer. The center rod incorporates spring loaded washers (95, 94) on each end to maintain contact with the pressure vessel domes as the pressure vessel expands and contracts with cell cycling. These changes in design offer the following advantages:

1. A 90% savings in the weight of the weldring (3 grams v. 30 grams of the prior art for a typical cell diameter of 8.9 cm).

2. The cylindrical portion of pressure vessel 54 now needs to be just long enough to contain electrode stack 56. This permits a shorter axial length for battery 49.

3. Sizing of the two pressure vessel portions becomes more flexible, for example, pressure vessel 54 may be fabricated from two identical halves, reducing part count and production costs.

4. The center of gravity of battery 49 becomes close to its geometric center, simplifying design of the structural support hardware.

5. The design of the weld ring (70) permits better continuity of the insulating coating or wall wick (92) inside the pressure vessel (54). It also permits location of the weld ring (70) on any portion of the cylindrical section of the pressure vessel (a preferred position is midway between the two domed ends of the vessel).

6. The bus bars (58, 68) are better restrained, thus enhancing vibration strength.

By eliminating the weldring (70) as a stack axial support mechanism and utilizing the end plates (52, 60) in a multifunctional manner, the present invention makes it possible to relocate the cell terminals (73, 63) from the center cylindrical axis of the pressure vessel to a more advantageous location, i.e., near the bus bars (68, 58) on each side of the vessel. This offers the following advantages:

1. The structural support is now primarily provided by the center rod (51) and end plates (52, 60). This allows for the use of weaker and therefore lighter electrical feedthroughs (72, 62).

2. The total lengths of terminals 73, 63 are reduced. This means that the electrical conduction path and mechanical moment arm length have simultaneously been reduced. Thus, for equal strength and internal resistance in the bus bars (68, 58) and terminals (73, 63) as in prior art cells, reduced cross-sectional area can be employed for the bus bars and terminals. This reduced length and cross-section yields a significant weight reduction.

3. The total axial length of the battery (49) is reduced over that of the prior art (7). The result is a smaller, lighter pressure vessel (54) and mounting sleeve (110). Because the mounting sleeve is shorter, it can also be thinner. Since the mechanical load is reduced (battery center of gravity is closer to the base plate 114), the conductive heat dissipation path is shortened. The consequence is another substantial weight savings and better thermal control.

4. The total volume of battery 49 is reduced. This is important in many applications, such as in a spacecraft.

DESCRIPTION OF THE DRAWINGS

These and other more detailed and specific objects and features of the present invention are more fully disclosed in the following specification, reference being had to the accompanying drawings, in which:

FIG. 7 is a side view of center rod 51 of the battery of the present invention;

FIG. 8 is an end view of center rod 51, viewed along lines 8—8 of FIG. 7; and

FIG. 9 is a side view, partially in cross-section, of the battery of the present invention mounted in a typical mounting sleeve.

DESCRIPTION OF THE PREFERRED EMBODIMENTS

Figure 1:
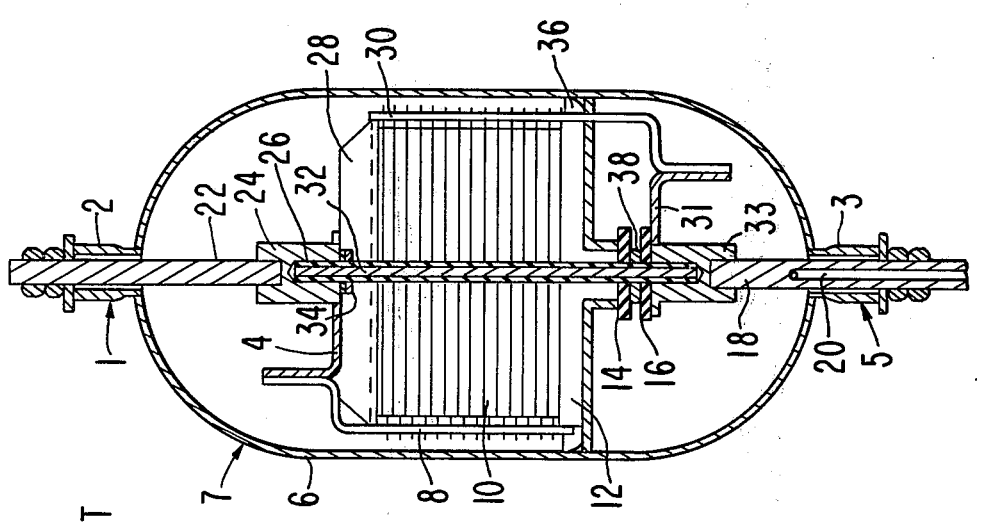
FIG. 1 is a cross-sectional side view of a typical metal-gas battery of the prior art.

FIG. 1 exemplifies a state-of-the-art metal-hydrogen battery 7 as depicted in U.S. Pat. No. 4,115,630. Pressure vessel 6 is made of a strong yet thin substance and contains a pressurized gas. Pressure vessel 6 expands during charging of battery 7 due to increase in pressure within. Terminal 1 of positive polarity comprises hermetic insulating seal 2, which shields positive feedthrough 22 from the conductive wall of pressure vessel 6. Note that feedthrough 22 is aligned with the cylindrical axis of battery 7.

Feedthrough 22 forms a conductive path via coupler 24 and clamp 4 to positive bus bar 8, which serves to conduct the current produced by electrode stack 10, where electrochemical energy conversion and storage occurs. Top end plate 28 and bottom end plate 12 sandwich the electrode stack therebetween. Center rod 32 provides mechanical support for electrode stack 10 and end plates 28 and 12. Flange 34 is rigidly attached to center rod 32 and exerts downward axial force on end plate 28 and thence electrode stack 10.

On the opposite side of the battery is negative terminal 5. Negative bus bar 30 connects to negative feedthrough 18 via clamp 31 and coupler 33. Seal 3 keeps the gaseous electrode within vessel 6 and provides electrical insulation between vessel 6 and feedthrough 18.

Note that feedthrough 22, rod 32, and feedthrough 18 are aligned end-to-end along the cylindrical axis of battery 7.

Fill port 20 is bored through feedthrough 18, serving as a means by which electrolyte and gas are filled into the interior of vessel 6.

Internal nut 38 is tightened about center rod 32 for providing axial compression of electrode stack 10. Insulating sleeve 26 and insulating washers 14 and 16 provide electrical insulation between center rod 32 (which is a conductive material such as stainless steel), electrode stack 10, and couplers 24 and 33.

Weld ring 36 is a metallic ring by which two portions of pressure vessel 6 are welded together during fabrication of battery 7. Weld ring 36 is connected to bottom end plate 12 as well as to pressure vessel 6 so as to provide mechanical support to stack 10 at points other than at the extreme ends of battery 7. Note that end plates 28 and 12 do not contact the wall of pressure vessel 6.

Figure 2:
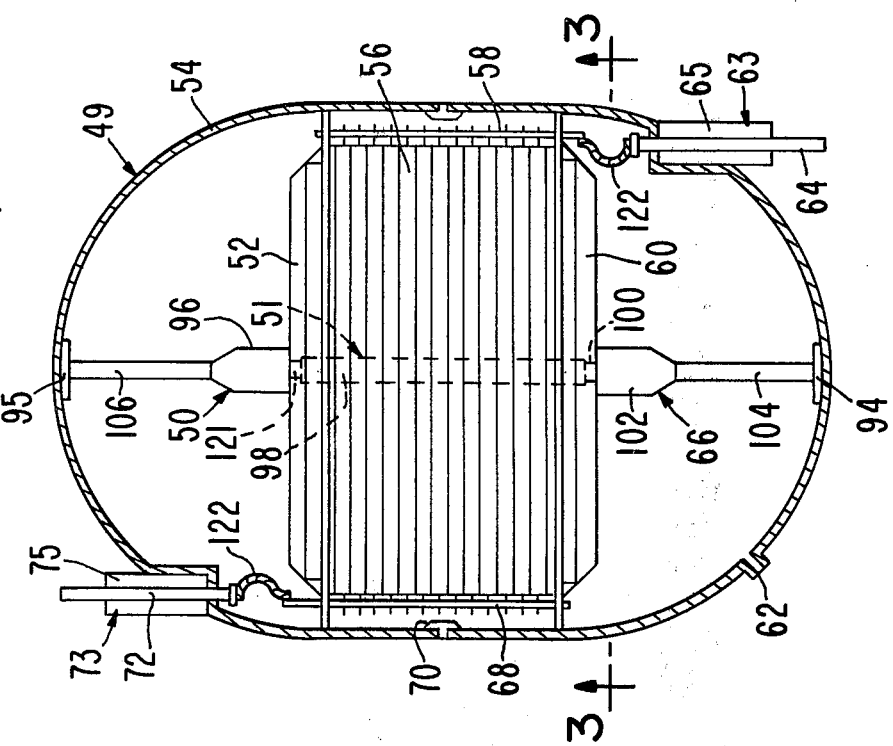
FIG. 2 is a partly cross-sectional, partly schematic side view of the battery of the present invention.

A cross-sectional side view of battery 49 of the present invention is seen in FIG. 2. The first reactant is a metal, metal oxide or hydroxide, such as nickel or silver and exists in the form of a stack of thin substantially circular plates 56 fabricated to form an electrode of that material, with adjacent plates not touching each other. The second reactant is a gas, such as hydrogen, under pressure and filling voids in the interior of vessel 56. Electrical energy is produced within stack 56 and is transported out of battery 49 via positive bus bar 68 and positive feedthrough 72 through positive terminal 73 on the one hand, and via negative bus bar 58 and negative feedthrough 64 through negative terminal 63 on the other hand. It is not necessary that the positive terminal be on the upper side of the battery, but it is used here for convenient reference.

The joints between bus bar 68 and feedthrough 72, and between bus bar 58 and feedthrough 64 are designed to accommodate relative motion between the stack and the terminal, e.g., by means of flexible connections 122, so that expansion of vessel 54 during battery cycling will not cause unwanted dislocations within stack 56.

A suitable material for pressure vessel 54 is optimum strength Inconel. The vessel, when designed for a factor of safety of 4, changes its shape somewhat less than 1% during cycling of battery 49 under typical circumstances.

Vessel 54 has a cylindrical portion terminated on each end by a portion of an ellipsoid, such as a half-spherical dome; this shape is effective in containing the gaseous component of the battery couple at high pressure.

The length of the cylindrical portion of vessel 54 along its major cylindrical axis is shorter than in the prior art for a comparable cell; this is made possible by the reconfiguration of the components of the battery, particularly the relocation of weld ring 70 and the method of support of the electrode stack 56.

Terminals 73 and 63 are moved away from the center cylindrical axis of battery 49 and are located between 5° and 85°, preferably 60°, away from the apex of each dome portion of vessel 54; this is much closer to electrode stack 56, near the cylindrical portion of vessel 54.

Moving terminals 73 and 63 away from the main cylindrical axis of the battery has the advantages outlined under "Summary of the Invention", above. Additionally, this design feature provides torsional support for the electrode stack 56, thereby preventing unwanted disruptions to the stack which may be caused by vibration.

The wall of vessel 54 is indented at two places to provide a relatively flat surface perpendicular to the major battery axis for each terminal 73, 63. Bosses 75, 65, preferably fabricated of the same material as vessel 54, are welded around holes formed in each flat surface, to form support for terminals 73, 63, respectively. Additionally, bosses 75, 65 are welded to vessel 54 in other places to aid in the support of the understandably weaker indented regions of vessel 54. To enhance this support, the entire assembly is heat treated to achieve maximum strength in vessel 54, bosses 75, 65, and the weld joints.

The terminal seals are preferably fabricated according to the teachings of U.S. patent application Ser. No. 297,374, filed Aug. 28, 1981, commonly assigned with the present invention.

Bus bars 68 and 58 connect onto terminals 73 and 63, respectively, eliminating the heavy and electrically resistive clamps 4 and 31, and couplers 24 and 33, of the prior art.

End plates 52 and 60 are made of an insulative material; they provide axial compression of electrode stack 56, and radial support for stack 56 as further described below.

Center rod 51, which comprises middle section 98 and end sections 50 and 66, is made of an electrically insulative material with a high strength-to-weight ratio, and passes through the centers of each of the electrodes in electrode stack 56. Center rod 51 is aligned along the major cylindrical axis of battery 49. Center rod 51 makes an axially-outward pressing but sliding contact with the inner wall of pressure vessel 54 via washers 95 and 94, which are spring-loaded. Thus, electrode stack 56 is not disrupted by normal expansions and contractions of pressure vessel 54 which occur with changes in temperature and pressure. The springs are pre-loaded, so that under worst-case vessel expansion and vibration loads, positive support is maintained at both ends of vessel 54.

One of the pressure vessel domes is provided with a cylindrical fill tube 62 which serves to provide access to the interior of battery 49 for filling with the electrolyte during the assembly of the battery. Alternatively, the fill tube junction can be integrated into the design of one of the terminals.

Weld ring 70 serves the single purpose of facilitating the welding of two portions of pressure vessel 54 together. This frees up the previously rigid bond between electrode stack 10 via end plate 12 and weldring 36 of the prior art. Since weld ring 70 is no longer fulfilling the function of rigidly holding one of the end plates, it permits the entire cylindrical area of battery 49 to be used for electrode stack 56, thus enabling the axial shortening of battery 49 and corresponding weight and volume reductions which are so important for spacecraft applications. Weld ring 70 may now also be located at any point along the cylindrical part of the vessel, for example, at its center.

Figure 3:
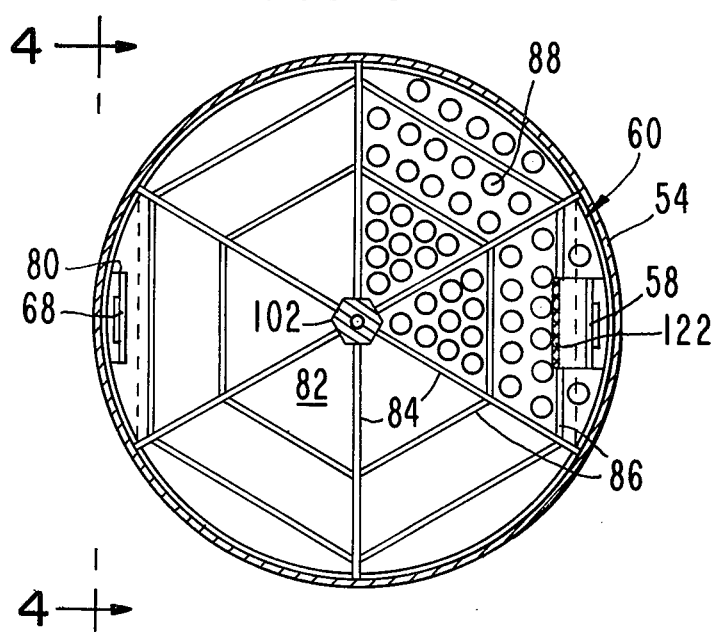
FIG. 3 is a cross-sectional end view of the battery of the present invention, taken along lines 3—3 of FIG. 2, showing end plate 60.
Figure 4:
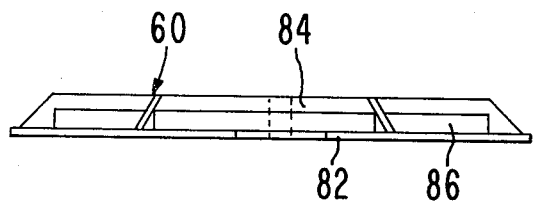
FIG. 4 is a side view of end plate 60 of the battery of the present invention, taken along lines 4—4 of FIG. 3.

The details of end plates 52 and 60 may be observed in FIGS. 3 and 4. FIG. 3 shows the bottom view of end plate 60, which is virtually identical to end plate 52. Flat circularly shaped plate 82 is the largest of the components of end plate 60. It may be cut through by numerous holes 88, which advantageously reduce the weight of plate 82, while allowing a large surface area for compression of electrode stack 56. FIG. 3 shows, for purposes of illustration, only one-third of plate 82 cut with holes; typically, all of plate 82 may be so fabricated.

Plate 82 is notched on its negative terminal periphery to provide for the passage therethrough of negative bus bar 58, and is notched on its positive terminal periphery at notch 80 to provide for the termination of positive bus bar 68. Each bus bar 58, 68 can be bonded to plate 82 to supply additional support to the assembly.

Plate 82 is also cut through at its center by a cylindrical hole to permit the passage therethrough of center rod middle section 98.

Attached to flat plate 82 and fabricated of the same material are two sets of ribs. The first set consists of one or more coaxial ribs 86, that provide increased strength to plate 82 at a relatively low weight addition. They are shown as having a hexagonal shape but could have some other pattern as well.

Attached to coaxial ribs 86 is a set of radial ribs 84, whose function is to provide additional strength to plate 82 and additionally a radial force outward onto the inside of pressure vessel 54, and thus radial support to electrode stack 56. The radial ribs 84 are dimensioned so as to deform the vessel 54 very slightly prior to pressurization of the battery. This provides continued support when the vessel expands under pressure, and limits movement of stack 56. There should be several (3 or more) radial ribs 84 so there will be several (3 or more) points of contact between each end plate 52, 60 and vessel 54.

It is desired that the various components of center rod 51 and end plates 52 and 60 be electrically insulative, chemically resistant to the cell environment, and have a high strength-to-weight ratio. Suitable materials are high strength polymers such as reinforced polyphenylene sulfide polystyrene acrylonitrile, polystyrene, and polysulfone. Such parts can be readily fabricated by means of molding, reducing machine time and costs as compared with the prior art.

Figure 5:
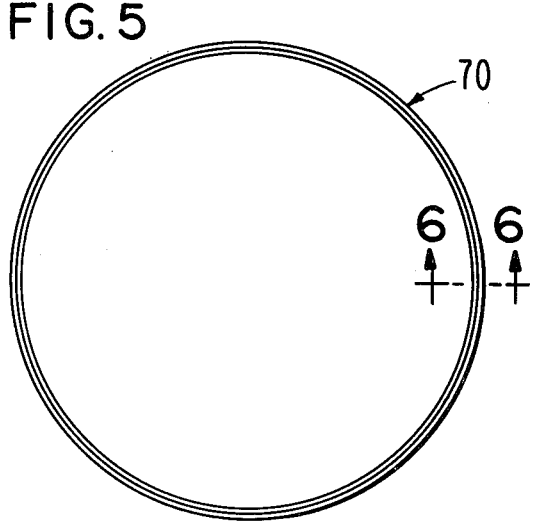
FIG. 5 is a top view of weld ring 70 of the present invention.
Figure 6:
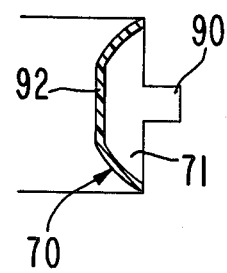
FIG. 6 is a cross-sectional side view of weld ring 70 of the present invention, taken along lines 6—6 of FIG. 5.

FIGS. 5 and 6 illustrate weld ring 70 of the present invention. Weld ring 70 is typically fabricated of the same material as pressure vessel 54 and has a generally circular shape so that it fits snugly within the inner wall of vessel 54 coaxially with its major cylindrical axis.

The cross-sectional view of weld ring 70 is illustrated in FIG. 6. Lip 90 fits between the two portions of pressure vessel 54 that are to be joined and provides a surface area and filler material for welding. Interior portion 71 provides additional surface area and support of molten metal during welding and fits within the assembled vessel 54. The surface of portion 71 which faces inward is optionally coated with a thin layer of a material 92 to provide any desired electrolyte management or insulative function. Material 92 should have a high heat resistance so as to withstand the heat of the welding process. Material 92 can advantageously be coated throughout the entire interior surface of pressure vessel 54. For an insulative function, suitable materials 92 are polyphenylene sulfide, Teflon TM or any chemically resistant insulating compound. For an electrolyte management function an absorbent, chemically resistive material such as zirconia is suitable. The design of the weld ring provides automatic continuity of the coating layer when the vessel is assembled.

FIG. 7 illustrates the details of center rod 51, which has three major elongated, generally cylindrically shaped portions, support rod 98, and nuts 50 and 66. The interior end of nut 50 is a raised region 96; similarly, the interior end of nut 66 is a raised region 102. Regions 96 and 102 provide a relatively wide surface area for axial compression of electrode stack 56 and a hexagonal cross-section for tightening the center rod assembly.

Portions 50 and 66 terminate on their outer ends by spring loaded washers 95 and 94 respectively, which provide outward compression along the center axis of battery 49 against the interior of pressure vessel 54. (Washer 95 is not illustrated in FIG. 7). Center rod 51 is not bonded to pressure vessel 54. Rather, washers 95 and 94 are typically fabricated of a material such as Inconel, which may be coated with Teflon TM that would provide relatively little friction with pressure vessel 54 so as to facilitate the independent expansion or contraction of vessel 54 with respect to center rod 51 and the accompanying electrode stack 56. Thus, electrode stack 56 is not disrupted unnecessarily.

Nuts 66 and 50 may be hollowed out for weight saving purposes.

Center section 98 supports electrode stack 56. Center section 98 terminates on each end by means of outer threads 100 and 121 which screw into nuts 66 and 50 at raised areas 102 and 96 respectively. Rod 98 is not usually hollowed out from within and must be strong enough to support the electrode stack 56. Center section 98 may be varied in length to accommodate larger or smaller electrode stacks in different capacity batteries.

The outer surface of portions 96 and 102 can have hexagonal cross-sections to facilitate tightening by means of a wrench, as illustrated in FIG. 8. A circular or other cross-section could also be used. Center section 98 and nut 50 or nut 66 may be molded together as one part.

FIG. 9 illustrates a suitable method of mounting battery 49. Cylindrical sleeve 110 surrounds battery 49 and provides both mechanical support and a path for the transfer of excess heat away from battery 49. Cylindrical sleeve 110 is firmly jacketed around battery 49 and fixed in place by means of cell restraining screws 116. Cylindrical sleeve 110 is connected at the bottom to base plate 114, which serves as a heat sink, by means of cell holddown hardware 112.

Pressure monitoring strain gauges 120 may be mounted at the top of battery 49 to monitor the pressure (and therefore state of charge) within battery 49. Resistor heater tape 118 may be attached circumferentially around cylindrical sleeve 110 at the top of sleeve 110 to provide a means to thermally regulate heat loss from battery 49 during periods of solar eclipse when temperatures may be lower than desired for a spacecraft application. As described above, sleeve 110 can be made longitudinally shorter than in the prior art, thus reducing weight.

When fabricated according to the teachings of the present invention, a total weight reduction of approximately 150 grams is possible for a 30Ah battery cell which in the prior art design of FIG. 1 weighed approximately 890 grams. Thus, a 17% weight savings can be achieved in battery 49, plus estimated 20% weight savings on cylindrical sleeve 110 and associated hardware. Additionally, the parts count is reduced by about a dozen. The reduced parts count lowers cost of manufacture and streamlines production. Furthermore, it is not known that any of the major operating parameters of prior art batteries outperform corresponding parameters of the battery of the present invention.

The structural differences of the present invention over the prior art as exemplified by FIG. 1 can be summarized as follows:

The interior of battery 49 may operate at higher gas pressures or greater safety margins due to structural changes.

Weld ring 70 can be freely located along the cylindrical portion of vessel 54. Since weld ring 70 no longer has to act as an electrode stack support, all of the exposed surface of weld ring 70 can be coated with material 92 so as to provide continuity of electrical insulation and electrolyte barrier or wall wick coating inside the pressure vessel.

Seals 2 and 3 and other components of terminals 1 and 5 of the prior art can be reduced in size because of the smaller size of feedthroughs 72 and 64 and shorter electrical path length. Feedthroughs' 72 and 64 structural support function is confined to limiting axial rotation of electrode stack 56.

Couplers 24, 33 and clamps 4, 31 of the prior art can be eliminated.

Bus bars 68 and 58 can be made shorter and thinner for similar reasons as for feedthroughs 72 and 64.

The insulation 26 around center rod 32 is now built into center rod 51; therefore, insulating sleeve 26 and insulating washers 14 and 16 of the prior art are eliminated.

Internal nut 38 of the prior art is eliminated because it is now built into center rod 51.

The end plates 52 and 60 are no longer restrained to the pressure vessel 54 via weld ring 70, permitting expansion or contraction of vessel 54 independently of electrode stack 56.

The above description is included to illustrate the operation of the preferred embodiments, and is not meant to limit the scope of the invention. The scope of the invention is to be limited only the following claims. From the above discussion, many variations will be apparent to one skilled in the art that would yet be encompassed by the spirit and scope of the invention.

What is claimed is:

1. A pressurized metal-gas battery comprising:
   an enclosed pressure vessel containing a stack of substantially flat electrodes, a reactant gas, and an electrolyte;
   a substantially flat non-conductive end plate placed on each of two ends of said stack, said end plates sandwiching said stack therebetween;
   a generally cylindrical non-conductive center rod passing through the centers of said stack and end plates, said rod aligned with the major axis of said pressure vessel;
   wherein said end plates and center rod exert pressure against the inner wall of said vessel but are not bonded thereto, so that the electrode stack is mechanically supported and is not significantly disrupted by changes in size of the pressure vessel during cycling of the battery.

2. The battery of claim 1 wherein said vessel comprises two sections, and said battery further comprises a generally circular weld ring positioned between said two sections to facilitate the welding together thereof, wherein said weld ring is not attached to said stack and is not attached to either end plate.

3. The battery of claim 2 wherein said sections are substantially identical, each having the shape of a right circular cylindrical sleeve capped by an ellipsoidal dome, and thus the weld ring is positioned midway along a cylindrical region of said welded-together pressure vessel.

4. The battery of claim 1 wherein said center rod and end plates are fabricated of materials which are resistant to corrosion and are electrically insulating.

5. The battery of claim 4 wherein said materials are from the group consisting of polyphenylene sulfide, polystyrene arylonitrile, polystyrene, and polysulfone.

6. The battery of claim 1 wherein each end of said center rod terminates in a spring-loaded device so that said center rod presses axially outwardly against the inner wall of said pressure vessel along the major axis thereof but is slidable with respect thereto.

7. The battery of claim 6 where said spring loaded device is a substantially circular washer.

8. The battery of claim 1 wherein the pressure vessel has the shape of a right circular cylindrical sleeve, each open end of the sleeve terminating in an ellipsoidal dome;
   said battery further comprising a positive and a negative terminal positioned on opposing domes, each terminal situated between 5° and 85° from the apex of its dome;

wherein the terminals are connected to opposing sides of the electrode stack.

9. The battery of claim 8 wherein the terminals are aligned substantially parallel to the cylindrical axis of the battery.

10. The battery of claim 8 wherein a flexible stress relief loop is used to connect each terminal to the electrode stack.

11. A pressurized metal-gas battery comprising:
an enclosed pressure vessel having the shape of a right circular cylindrical sleeve, each open end of the sleeve terminating in an ellipsoidal dome;
a positive and a negative terminal positioned on opposing domes, each terminal aligned substantially parallel to the cylindrical axis of the battery and situated between 5° and 85° from the apex of its dome; and
a stack of substantially flat metallic electrodes and a gaseous reactant disposed within the interior of said vessel; wherein
said terminals are connected to opposing sides of said stack;
each dome is indented and perforated in the vicinity of its associated terminal position, thus providing a substantially flat surface, substantially orthogonal to the cylindrical axis of the battery and having a single hole, for accomodating each terminal; and
a reinforcing boss having a generally cylindrical opening for accomodating its associated terminal is welded into each indentation, each opening being substantially aligned with the cylindrical axis of the battery and with one of said holes.

12. The battery of claim 11 wherein the indented vessel with bosses welded thereto is heat treated to maximize the strength of the vessel, bosses, and welds.

13. The battery of clam 11 wherein a flexible stress relief loop is used to connect each terminal to said stack.

* * * * *